United States Patent [19]

Stumpe et al.

[11] Patent Number: 5,543,267
[45] Date of Patent: Aug. 6, 1996

[54] PHOTO-INDUCED OPTICALLY ANISOTROPIC AMORPHOUS FILM MATERIALS FROM SIDE GROUP POLYMERS

[75] Inventors: Joachim Stumpe, Berlin, Germany; Valery Shibaev, Moscow, Russian Federation; Sergei Kostromin, Moscow, Russian Federation; Sergei Ivanov, Moscow, Russian Federation; Thomas Fischer, Berlin, Germany; Lutz Läsker, Berlin, Germany; Ralf Ruhmann, Berlin, Germany; Uwe Claussen, Leverkusen, Germany

[73] Assignee: Agfa-Gevaert AG, Germany

[21] Appl. No.: 210,425

[22] Filed: Mar. 21, 1994

[30] Foreign Application Priority Data

Mar. 30, 1993 [DE] Germany ............ 43 10 368.5
Nov. 23, 1993 [DE] Germany ............ 43 39 862.6

[51] Int. Cl.$^6$ ............................................. C08F 220/34
[52] U.S. Cl. ................ 430/290; 430/20; 526/298; 526/304; 526/312; 526/313; 526/292.2; 252/585; 252/299.01; 428/1
[58] Field of Search .................... 526/298, 304, 526/312; 430/20, 290; 252/585, 299.01

[56] References Cited

U.S. PATENT DOCUMENTS 4,925,589  5/1990  Lorenz ................ 252/299.01
5,023,859  6/1991  Eich et al. ............ 365/113

FOREIGN PATENT DOCUMENTS 0322708   7/1989   European Pat. Off. .
0335302  10/1989   European Pat. Off. .
2246138   1/1992   United Kingdom .
92/02930  2/1990   WIPO .

OTHER PUBLICATIONS

A. M. Patterson, a German–English Dictionary for Chemists, 3d Ed., Wiley, New York, 1950, p. 156.
The Merck Index, 9th Ed., Merck & Co., Rahway NJ, 1976 p. 283.
die Makromolekulare Chemie, "Synthesis and Phase Behavior of Liquid Crystalline Polyacrylates", No. 10 Basel, DE (1992) pp. 2311–2321 Portugall et al.
Makromol. Chem., "Erasable holograms in polymeric liquid crystals", Rapid Commun. 8, pp. 467–471 (1987). Eich et al.
Makromol. Chem. "Laser–induced birefringence in homeotropic films of photochromic comb–shaped liquid–crystalline copolymers with azobenzene moieties at different temperatures", Rapid Commun. 12, pp. 709–715 (1991) Ivanov et al.
Makromol. Chem., "Photoinduced optical anisotropy of liquid–crystalline side–chain polymers with azochromophores by linearly polarized light of low intensity", Rapid Commun. 12, pp. 81–87 (1991) Stumpe et al.
Liquid Crystals, "An infrared spectroscopic study of photo–induced reorientation in dye containing liquid–crystalline polymers", vol. 11, No. 2, pp. 251–267 (1992) Anderle et al.
Macromolecules, "Azo Polymers for Reversible Optical Storage", vol. 25, pp. 2268–2273 (1992) Nathansohn et al.

*Primary Examiner*—Mark Nagumo
*Attorney, Agent, or Firm*—Connolly & Hutz

[57] ABSTRACT

Flat materials made from a polymer with a backbone and side groups branching off the backbone (side group polymer), which polymer has the following structural features (1) to (3):

(1) the side group polymer contains at least one photoinducibly configuration-changing side group;

(2) the side group polymer contains at least one permanently conformationally anisotropic side group with high anisotropy of molecular polarisability which differs from (1);

(3) the side group polymer contains flexible spacer groups between the backbone and the side groups (1) and (2);

wherein the flat material in the glassy state of the side group polymers is optically isotropic, transparent, non-scattering and amorphous before irradiation and, after irradiation, is transparent and durably birefringent and dichroic due to a reversible, photoinduced alignment of the side groups (1) and (2) in the glassy state, may be purposefully modified in terms of their optical properties by the action of light.

13 Claims, No Drawings

PHOTO-INDUCED OPTICALLY ANISOTROPIC AMORPHOUS FILM MATERIALS FROM SIDE GROUP POLYMERS

The invention relates to flat materials consisting of side group polymers which contain at least one photoinducibly configuration-changing side group (1) and one permanently conformationally anisotropic side group (2) which differs from (1), which side groups are attached to the polymer backbone via flexible spacer groups. Before irradiation, the flat materials according to the invention are optically isotropic, amorphous, transparent and non-light-scattering in the glassy state of the polymers. By irradiation of the flat materials in the glassy state of the polymers, the side groups are photochemically aligned causing the flat materials to become birefringent and dichroic without losing their transparency. The photoinduced optical anisotropy may be reversibly modified or cancelled thermally or by renewed irradiation.

The materials are suitable for the reversible storage of optical information and for the production of passive or optically switchable components.

Various polymers with photochromic groups are known from the literature, the optical properties of which, such as absorption, emission, reflection, birefringence or scattering, may be reversibly altered by means of photoinduced physical and/or chemical processes. An interesting and novel method of reversibly changing the optical properties of polymers consists in the photoinduced variation of the degree of order, direction of orientation and distribution of orientation or morphology of polymer films by various processes. The photoinduced alteration of order in polymer films is used for information storage.

Eich and Wendorff (Makromol. Chem., Rapid Commun. (1987) 8, 467) thus describe liquid crystal polymers containing azobenzene. These polymers form liquid crystalline domains in which the action of light reorients only those groups previously having passed through an isomerisation reaction (Anderle, Birenheide, Wendorff, Makromol. Chem., Macromol. Symp. 44, 11–22 (1991)). The storage effect is based upon disruption of the ordered state of the monodomains by reorientation of the photochromic side groups in an otherwise rigid matrix.

Most recently, further liquid crystalline polymers have been discovered in which photochemical reorientation of the photochromic groups brings about a cooperative reorientation of non-photochromic groups as well, such that the optical axis of the monodomains is rotated (Ivanov, Yakolev, Kostromin, Shibaev, Läsker, Stumpe, Kreysig, Makromol. Chem., Rapid Commun. 12, 709–715 (1991)).

The serious practical disadvantage of liquid crystalline systems is that their use generally demands perfect, macroscopically uniform orientation to a monodomain by means of external fields and/or surface effects.

While the orientation of liquid crystalline polymers with electrical and magnetic fields and by means of mechanical forces and surface effects involves established methods, these methods are, however, extraordinarily technically complex, such that the wide use of such flat liquid crystalline polymer materials is not yet possible.

It has also been discovered that it is in principle possible to induce birefringence in an amorphous system (Anderle, Birenheide, Eich, Wendorff, Makromol. Chem., Rapid Comm. (1989) 10, 477 et seq and EP 335 302). However, this effect is some orders of magnitude smaller than that obtained from a liquid crystalline monodomain and is consequently not practically usable.

It is furthermore known (Natansohn, Rochon, Gosselin, Xie, Macromolecules 25, 2268–2273 (1992)) that certain homopolymers may develop anisotropic properties on irradiation with light.

Such a system is structurally invariant, is not durably stable and its properties are largely fixed. A particular advantage of copolymeric systems compared with uniform polymers is precisely their flexibility, which allows their properties to be adapted to particular applications while retaining information storage properties.

It would be of very considerable advantage in terms of the practical usability of photoaddressable layers to have a system which on the one hand may be handled as an optically isotropic, amorphous, homogeneous film and on the other hand has the outstanding dichroic and birefringent properties of a liquid crystalline polymer film, combined with a certain band width of the structural variation of the copolymers in order to make it possible to adapt other material properties to the particular practical requirements.

The object of the invention was thus to provide a system on the one hand providing an optically isotropic flat material, while on the other hand becomes dichroic and birefringent under the action of light in a manner as is known from very good liquid crystalline systems.

This object is achieved by side group co- and terpolymers which have photochromic side groups and permanently conformationally anisotropic side groups with highly anisotropic molecular polarisability, which, unlike previously known photochromic liquid crystalline polymers and their variants, are technically variable and may be readily converted into optically isotropic, transparent, non-light-scattering, amorphous flat materials.

Since the side group polymers have a range of structural features, polymer backbone, various side groups, spacer groups between the backbone and the side groups, terminal groups of the side groups, and the structural units influence each other, it is not possible to state a fixed rule predicting with absolute certainty which structural features will give rise to amorphous flat materials. There is, however, a range of options available to the person skilled in the art, either to facilitate the kinetic suppression of the spontaneous formation of liquid crystalline ordered states by an appropriate combination of structural units, or alternatively to produce amorphous polymers with structural units 1 and 2, which for thermodynamic reasons cannot form liquid crystalline ordered states because they contain certain structural units which disrupt the ordering tendency and of which examples are stated further below.

In the light of the teaching stated below, the discovery and purposeful production of such amorphous systems is readily possible with sufficient certainty of success after some initial investigatory testing.

The present invention thus provides flat materials made from a polymer with a backbone and side groups branching off the backbone (side group polymer), which polymer has the following structural features (1) to (3):

(1) the side group polymer contains at least one photoinducibly configuration-changing side group;

(2) the side group polymer contains at least one permanently conformationally anisotropic side group with high anisotropy of molecular polarisability which differs from (1);

(3) the side group polymer contains flexible spacer groups between the backbone and the side groups (1) and (2);

characterised in that the flat material in the glassy state of the side group polymers is optically isotropic, transparent, non-scattering and amorphous before irradiation and, after irradiation, is transparent and durably birefringent and dichroic due to a reversible, photoinduced alignment of the side groups (1) and (2) in the glassy state.

Photoinducibly configuration-changing groups are, for example, groups containing double bonds, the cis and trans configurations of which may be interchanged by the action of light. These groups may additionally have elevated molecular conformational anisotropy which is, however, not permanent.

Permanently conformationally anisotropic groups are, for example, groups having a rigid, rod-like molecular shape, for example bisphenyl groups, benzoic acid anilide groups or benzoic acid phenyl ester groups.

The formation of liquid crystalline ordered states is rendered thermodynamically impossible by the flat polymer material having one or more of the structural features (4) from the group (a) to (g):

(a) at least two kinds of spacer groups (3) of differing length are incorporated;

(b) at least some of the spacer groups (3) have heteroatoms;

(c) at least some of the spacer groups (3) are branched;

(d) at least some of the side groups (1) or (2) are branched;

(e) at least some of the side groups (1) or (2) are terminated with branched end groups;

(f) at least some of the monomer units of the side group polymer do not form liquid crystalline phases;

(g) the side group polymer contains further side groups (5) which do not exhibit permanent conformational anisotropy.

The polymers are in particular characterised in that they contain structural units 1 and 2 with elevated molecular conformational anisotropy and high anisotropy of molecular polarisability, that, however, the tendency to form liquid crystalline ordered states arising from the conformational anisotropy and other intermolecular interactions of the side groups is effectively suppressed by structural features a–g.

The claimed flat materials thus combine the good optical properties of amorphous films and, in comparison with liquid crystalline monodomain films, their significantly simpler production techniques with elevated photoinduced optical anisotropy, as was previously known only in liquid crystalline polymer monodomains.

In kinetic terms, the formation of liquid crystalline ordered states in the claimed flat liquid crystalline polymer materials may be suppressed, by the ordering tendency of the polymers being as far as possible eliminated by the structural features a–g and by the polymers having only low phase transition enthalpies ($\Delta H < 0.8$ J/g), or by the formation of a light-scattering polydomain structure being suppressed by very strong intermolecular interactions between side groups 1 and 2, achieved in the examples in the polymers with hydrogen bridge formation and CT interactions, or by the formation of a light-scattering liquid crystalline polydomain structure also being suppressed by high viscosity of the isotropic polymer films above the clarification point, achieved in the examples by polymers with short spacers or stiff polymer backbones, by the polymers being frozen into optically isotropic, homogeneous, non-light-scattering films by rapid cooling from the isotropic melt to the glassy state.

In another preferred embodiment of the invention, the backbone of the side group polymer is formed of monomers bearing the side groups (1) via a spacer group (3), of monomers bearing the side groups (2) via spacer groups (3) and optionally further monomers, wherein in particular the proportion of monomers with side group (1) is 10 to 80 mol %, the proportion of monomers with side group (2) is 20 to 90 mol % and the proportion of further monomers is 0 to 50 mol %.

The flat material according to the invention preferably consists of a side group polymer in which the backbone is a poly(meth)acrylate, a polysiloxane, a poly-α-oxirane, a polyether, a polyamide, a polyurethane, a polyester or a polycarbonate, the side group (1), including the flexible spacer group (3), corresponds to the formula (I) and the side group (2), including the flexible spacer group (3), corresponds to the formula (II):

in which $S_1$, $S_2$ mean a spacer group, $Q_1$, $Q_2$ mean —O—, —CO—O—, —O—CO—, —CO—NR$_1$—, —NR$_1$—CO— or —NR$_1$—, P means a photoinducibly configuration-changing group, M means a permanently conformationally anisotropic group differing from P, $X_1$, $X_2$ mean a terminal substituent and $R_1$ means hydrogen or $C_1$–$C_4$ alkyl.

A preferred flat material is one in which $S_1$, $S_2$ mean a group —(CH$_2$)$_n$—, optionally interrupted with —O—, —NH— or —Si(R$_5$)$_2$—, n means 2 to 14, P means —Ar(N=N—Ar)$_m$—, —ArN=CR$_2$—Ar—, —Ar—CR$_2$=N—Ar—, —Ar—CR$_2$=CR$_3$—COOR$_4$, —Ar—(CH=CH—Ar)$_m$, —ArCR$_2$=CR$_3$—Ar, —Ar—CR$_2$=CR$_3$—COR$_4$ or —Ar—CR$_2$=CR$_3$-cyclohexyl, $R_2$, $R_3$, $R_4$ mean H, $C_1$–$C_4$ alkyl, CN, OR$_2$, COOR$_4$, halogen, NO$_2$ or N(R$_5$), $R_5$ means H or $C_1$–$C_4$ alkyl, Ar means an optionally substituted aromatic ring system with 5 or 6 ring members, m means 1 or 2, M means a derivative of cholesterol or cholestane or one of the groups —Ar—Ar—, —Ar—Y—Ar—, —Ar—Y—Alk—, —Alk—Y—Ar—, —Alk—Ar— or —Ar—Alk—, Y means —CO—O—, —OCO—, —CONH—, —NHCO—, —N=CH—, —CH=N—, —N—NO—, —C(R$_5$)$_2$—, —C(R$_5$)$_2$—C(R$_5$)$_2$—, —O— or —NR$_1$—, Alk means an unbranched, branched or cyclic, optionally substituted, optionally olefinically unsaturated aliphatic group with 1 to 14 C atoms, $X_1$, $X_2$ mean hydrogen, CN, Alk, Y—Alk, aryl, Y—Ar, —N(Alk)$_2$, halogen or NO$_2$, in particular such a material in which the backbone is a poly(meth)acrylate, P means —Ar—(N=N—Ar)$_m$, —Ar—CR$_2$=CR$_3$—Ar— or —Ar—CR$_2$=CR$_3$—COOR$_4$, M means a residue of a biphenyl, benzoic acid anilide or a benzoic acid phenyl ester, $X_1$, $X_2$ mean H, CN, $C_1$–$C_8$ alkyl, $C_1$–$C_8$-alkoxy, $C_5C_7$ cycloalkoxy, phenyl, phenoxy, $C_1$–$C_4$ dialkylamino or nitro.

The side group polymer preferably has a glass transition temperature $T_g$ of $\geq 40°$ C.

The individual structural units of the polymers are per se known. In order to obtain the desired combination of properties, the physical molecular structure of the individual polymer units must be related to the other structural units contained in the polymer. The physical structure of individual polymer units is thus highly variable. The properties of these polymer films, which properties are substantially determined by weak intermolecular interactions, cannot be predicted by adding together the properties of the individual molecular units.

Of decisive importance to achieving the object of the invention is the planned and purposeful combination of the individual structural units in the polymers in order to obtain the claimed optically isotropic flat materials. In the claimed flat materials, structural units with elevated conformational anisotropy and elevated anisotropy of molecular polarisability are the pre-requisite for high levels of optical anisotropy. The intermolecular interactions of the structural units (1) and (2) are adjusted by the polymer structure such that the formation of liquid crystalline ordered states is suppressed and the optically isotropic, transparent, non-scattering films may be produced. On the other hand, the intermolecular interactions are nevertheless sufficiently strong that, completely surprisingly and unpredictably, a photochemically induced, cooperative, directed reorientation process of the photochromic and non-photochromic side groups is produced on irradiation with polarised light. This also determines the glass transition temperature of the polymers, which permits the ordered states to be frozen in at below $T_g$.

The optically isotropic flat materials claimed according to the invention are thus formed from side group polymers, the morphological, dynamic, photochemical and optical properties of which, due to the combination of structural units and the adjustment of the intermolecular interactions prevailing between these units, allow the efficient and durable induction and modification of optical anisotropy in amorphous flat materials and combine per se opposing properties.

Preferably, weak interactive forces arise between side groups (1) and (2) which are sufficient to ensure that a photoinduced configuration change of side group (1) brings about an identically directed reorientation of side group (2).

It has surprisingly been found that extremely high values of optical anisotropy could be induced in the claimed optically isotropic amorphous flat materials made of these photochromic polymers ($\Delta n$=0.01 to 0.2). The values are comparable with, or even higher than, those obtained in liquid crystalline polymer monodomains. They are significantly higher in comparison with amorphous polymers without these structural units.

Under the action of actinic light, ordered states are generated and modified in the flat materials and their optical properties are thus modulated.

The light used is preferably linearly or circularly polarised light of a wavelength within the range of the absorption bands of the photoinducibly configuration-changing side groups (1).

The side group polymers are produced and polymerised using processes known from the literature (DD 276 297, DE 38 08 430, Makromolekulare Chemie 187, 1327–1334 (1984), SU 887 574, Europ. Polym. 18, 561 (1982) and Liq. Cryst. 2, 195 (1987)).

Perfect, macroscopically uniform films may be produced, without costly orientation processes using external fields and/or surface effects being necessary. The films may be applied to substrates by spin coating, dipping, pouring or other easily controlled industrial coating processes, they may be pressed or allowed to flow between two transparent sheets, or they may be simply prepared as free-standing film by casting or extrusion. Such films may also be produced from liquid crystalline polymers containing structural units according to the invention by sudden cooling, i.e. by cooling at a rate of>100K/min, or by rapid elimination of the solvent.

Film thickness is preferably between 0.1 μm and 1 mm, particularly preferably between 0.5 and 100 μm.

Photoinduced orientation of the side groups, or writing information, is achieved by irradiation with actinic light appropriate for the photoinducibly configuration-changing group. This leads to an angle-dependent photoselection which brings about a reorientation of the photochromic groups and (by means of a cooperative effect) a continuous, identically directed reorientation of the permanently conformationally anisotropic side groups proceeding to a maximum of perpendicular in relation to the electrical vector of the excitation light.

When a film is illuminated with polarised light in the surface normals of a film, a preferred orientation is obtained in the plane of the film which in the case of linearly polarised light is uniform throughout the film, while if circularly polarised light is used the preferred direction is periodically modulated in accordance with the electrical vector of the excitation light along the surface normals. Irradiation with unpolarised light produces a preferred orientation perpendicular to the plane of the film.

Exposure to light is performed areally or locally with linearly or circularly polarised, coherent or non-coherent, mono- or polychromatic light, the wavelength of which is within the absorption range of the photoinducibly configuration-changing side groups.

Information is written with a laser point-by-point or areally with a laser or lamp without structure or using a mask at an intensity of 0.1 to 5,000 mW/cm$^2$ over a period of between 0.1 and 6,000 sec.

The reorientation process is extraordinarily effective. The change in birefringence which may be achieved at T<<$T_g$ is preferably between $\Delta n$=0.05 to 0.20.

The high levels of photochemically induced birefringence and of photochemically induced dichroism are the result of the molecular structure of the side groups, of the cooperative mechanism of photoinduced orientation giving rise to a state of identical macroscopic orientation of the photochromic and non-photochromic, but permanently conformationally anisotropic side groups, and of overcoming the limits of the reorientation processes inherent to liquid crystalline monodomains, as the intermolecular interactive forces of the liquid crystalline guest-host system stabilise the initially present order of the ordered material.

The preferred orientation is freely selectable, being solely dependent upon the selection of the direction of the electrical vector of the excitation light in relation to the polymer structure. At constant temperature and wavelength, the extent of orientation is solely dependent upon the irradiated energy, which may be varied either by time or the power of the light source. Orientation, birefringence and dichroism are thus freely selectable parameters which, under constant conditions, may be precisely reproduced on repeated writing and erasure. The photochemically induced optical anisotropy is durably maintained at temperatures below the glass transition temperature of the polymer after the light source is extinguished.

The effects are temperature dependent. When comparing the effects in different polymers, their glass transition temperature $T_g$ acts as a point of reference. As temperature rises, the maximum inducible optical anisotropy initially increases. In amorphous polymers, anisotropy falls dramatically at temperatures close to the glass transition temperature. In the case of amorphously frozen liquid crystalline polymers, anisotropy continues to rise even as the temperature increases above $T_g$ before completely disappearing in the vicinity of the clarification point. On the other hand, if stored at temperatures $T<T_g$, the data written (irrespective of the temperature at which they were written) are stable for years.

Reproducible, defined, continuously variable, durable birefringence may be induced in the polymers according to the invention. The birefringence may be represented as a defined contrast in transmitted or reflected polarised light. If polymers with side groups having dichroic properties are used, absorption or emission dichroism may correspondingly be reproducibly, specifically, continuously variably and durably induced. Uniform orientation is produced throughout the polymer film by means of uniform irradiation conditions. If irradiation conditions, such as energy dose and direction of polarisation, are locally varied, a film is produced which is structured with regard to the preferred orientation of the side groups, so giving rise to pixels with differing optical anisotropy.

The orientations produced may be entirely or partially erased by heating the polymers to above the glass transition temperature or, if they develop thermotropic mesophases, to above the clarification point. The requisite energy may be supplied thermally or with an appropriate light source.

The preferred direction in the distribution of orientation of the optically anisotropic film may also be cancelled by illumination with unpolarised actinic light and optical isotropy along the surface normals may be recreated. Repeated irradiation with the same source, but from a different position, of the electrical vector in relation to the polymer film leads to modification in the direction and extent of optical anisotropy. In this manner, it is possible to switch repeatedly between different states in relation to the direction and extent of optical anisotropy.

On the basis of these effects, the polymers according to the invention constitute a medium for reversible, optical data storage. As during film production, there is no requirement for measures to recreate the monodomains, even after erasure of the information.

The polymers according to the invention may be used for digital or analogue data storage in the widest sense, for example for optical signal processing, for Fourier transform and folding or in coherent optical correlation applications. Lateral resolution is limited by the wavelength of the read light. This permits a pixel size of down to 0.5 μm. Maximum contrast is 1:200. Up to 100 grey levels may thus be reproducibly written within one pixel, thus increasing storage density for digital storage.

This property makes the polymers according to the invention particularly suitable for image processing and for information processing using holograms, which may be reproduced by illumination with a reference wave. Similarly, the interference pattern of two equiphase monochromatic coherent light sources may be stored and storage density increased by means of the relationship between the electrical vector of the light and the related preferred direction in the storage medium. Three-dimensional holographic images may consequently be stored. Reading is achieved by illuminating the hologram with monochromatic, coherent light. In analogue storage, grey scale values may be continuously adjusted and spatially resolved. Information stored in an analogue manner is read in polarised light, wherein the positive or negative image may be retrieved depending upon the position of the polarisers. It is, on the one hand, possible to exploit the film contrast produced by the phase displacement of the ordinary and extraordinary rays between two polarisers, wherein the planes of the polariser are advantageously at an angle of 45° to the plane of polarisation of the write light and the plane of polarisation of the analyser is either perpendicular or parallel to the plane of the polariser. Another possibility is the detection of the deviation angle of the read light caused by the induced birefringence.

The polymers according to the invention may be used as optical components, which may be passive or optically switchable. Thus, elevated photoinduced optical anisotropy may be used to modulate the intensity and/or state of polarisation of light. Correspondingly, it is possible to produce components from a polymer film by holographic structuring, which have imaging properties comparable with lenses or gratings.

Particularly preferred side group polymers are of the formula (III)

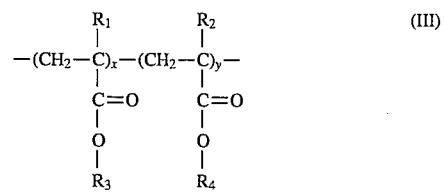

in which $R_1$ and $R_2$ mutually independently mean H or $CH_3$, $R_3$ means

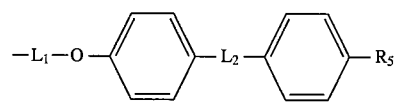

$R_4$ means

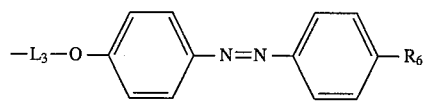

$L_1$ and $L_3$ mutually independently mean an alkene group with 2 to 14 C atoms optionally interrupted with 1 to 3 oxygen atoms, $L_2$ means a direct bond, —CO—NH—, —NH—CO—, —CO—O— or —O—CO—, $R_5$ and $R_6$ mutually independently mean a substituent, in particular H, CN, $C_1$-$C_6$ alkyl, $C_1$-$C_6$ alkoxy, di-$C_1$-$C_4$-alkylamino, halogen or nitro and x and y mean 0.1 to 0.9, wherein x+y=1 and the monomer units are randomly distributed in the side group polymer.

EXAMPLES

A. Synthesis of polymerisable monomers

Example 1

4-cyano-4'-(2-hydroxy-ethoxy)-diphenyl 3.0 g of KOH, 10 g of NC—$C_6H_4$—$C_6H_4$—OH and 6.15 g of ClCH$_2$CH$_2$—OH are consecutively dissolved in 50 ml of methanol in a glass ampoule. The ampoule is filled with argon, sealed and maintained at 115° C. for 50 hours. The ampoule is opened and the reaction mixture combined with 5 times its quantity of CHCl$_3$ in a separating funnel and extracted with water. After separation, the organic phase is dried with MgSO$_4$.

After elimination of the solvent, the product is chromatographically purified and then recrystallised once from benzene.

Yield: 10.4 g (85% of theoretical) F 150° C. K 122° C. N 126° C. I

In this and the following examples, the abbreviations used have the following meanings:

F: melting point
K: crystalline
G: glassy state
N: nematic phase
S: smectic phase
I: isotropic phase Figures in brackets denote monotropic phases.

4-(6-hydroxy-hexyloxy)-4'-cyanoazobenzene is produced in a similar manner.

Yield: 9.4 g (58.5% of theoretical) F: 150° C.

Example 2

4-cyano-4'-(6-hydroxy-hexyloxy)-diphenyl

A mixture of 25 ml of ethyl methyl ketone, 10 g of HO—C$_6$H$_4$—C$_6$H$_4$—CN, 7.1 g of K$_2$CO$_3$ and 13.9 g of HO—(CH$_2$)$_6$—Br is stirred and refluxed until conversion is complete (determined by thin-layer chromatography). The precipitate is then filtered out, the solvent completely eliminated, the product chromatographically purified and recrystallised once from benzene.

Yield: 13.4 g (81% of theoretical) K 97° C. S 112° C. I 4-(2-hydroxy-ethyloxy)-4'-cyanoazobenzene is produced in a similar manner.

Yield: 1.5 g (36% of theoretical) F: 184° C.

Example 3

4-cyano-4'-(2-acryloyloxy-ethyloxy)-diphenyl

A solution of 1.4 ml of ClOC—CH=CH$_2$ in 2 ml of absolute benzene is slowly combined with 2.8 g of NC—C$_6$H$_4$—C$_6$H$_4$—O—(CH$_2$)$_2$—OH in a mixture of 40 ml of absolute benzene and 1.95 ml of dry triethylamine with exclusion of moisture while the reaction mixture is stirred and heated (60° to 70° C). After 2 hours' stirring at 60° to 70° C., the reaction mixture is diluted with 200 ml of CHCl$_3$, washed with water, dried with MgSO$_4$ and the solvent evaporated. The product is recrystallised twice from methanol.

Yield: 2.67 g (78% of theoretical) F: 97.2° C.

4-cyano-4'-(2-methacryloyloxy-ethyloxy)-diphenyl is produced in a similar manner.

Yield: 1.4 g (69% of theoretical) F: 86° to 88° C.

4-(2-acryloyloxy-ethyloxy)-4'-cyanoazobenzene is produced in a similar manner.

Yield: 0.67 g F: 133.7° C.

4-(2-methacryloyloxy-ethyloxy)-4'-cyanoazobenzene is produced in a similar manner.

Yield: 0.78 g (89% of theoretical) F: 139.5° C.

4-cyano-4'-(6-acryloyloxy-hexyloxy)-diphenyl is produced in a similar manner.

Yield: 3.2 g (86.4% of theoretical) K 87.5° C. (N 80° C.) I

Example 4

β-[4-(4'-cyano)dipbenyloxy]ethyl-β'-chloroethyl ether

The product is produced from NC—C$_6$H$_4$—C$_6$H$_4$—OH and ClCH$_2$CH$_2$—O—CH$_2$CH$_2$—Cl in a manner similar to example 1.

Yield: 7.8 g (50.5% of theoretical) F: 58° to 61° C.

4-(β'-chloroethyloxy-ethyl-β-oxy)-4'-cyanoazobenzene is produced in a similar manner.

Yield: 4.6 g (42% of theoretical) F: 95° to 96° C.

Example 5

4-(β'-methacryloyloxy-ethyloxy-ethyl-β-oxy)-4'-cyanoazobenzene 1.49 g (0.012 mol) of dry powdered H$_2$C=C(CH$_3$)COOK is added to a solution of 2 g of Cl—CH$_2$CH$_2$—O—CH$_2$CH$_2$—O—C$_6$H$_4$—N=N—C$_6$H$_4$—CN in 10 ml of dry hexamethylphosphoric acid triamide with exclusion of moisture while the mixture is stirred. After 1 hour's stirring at room temperature and 1 hour at 70° C., the reaction mixture is combined with 5 times its quantity of CHCl$_3$ in a separating funnel and extracted with water. After separation, the organic phase is dried with MgSO$_4$. After elimination of the solvent, the product is recrystallised twice from methanol.

Yield: 1.9 g (84% of theoretical) F: 74.0° C.

4-(β'-acryloyloxy-ethyloxy-ethyl-β-oxy)-4'-cyanoazobenzene is produced in a similar manner.

Yield: 1.63 g (74% of theoretical) F: 113.5° C.

β[4-(4'-cyanodiphenyl)oxy]-ethyl-β'-methacryloyloxy-ethyl ether is produced in a similar manner.

Yield: 6.63 g (76% of theoretical) F: 64° C.

β[4-(4'-cyanodiphenyl)oxy]-ethyl-β'-acryloyloxy-ethyl ether is produced in a similar manner.

Yield: 0.88 g (71% of theoretical) F: 62° C.

Example 6

4-(6-methacryloyloxyhexyloxy)-benzoic acid-4-n-methoxyanilide 55.4 g of methacrylic acid, 15 g of 4-(6-hydroxyhexyloxy)benzoic acid, 2.25 g of hydroquinone, 2.25 g of p-toluenesulphonic acid and 150 ml of chloroform were refluxed for 18 hours using a water separator and then combined with 1.66 g of sodium acetate trihydrate in 5 ml of water. Chloroform and unreacted methacrylic acid were eliminated in a rotary evaporator. The reaction product was taken up in 750 ml of chloroform and filtered. After washing the reaction product with 100 ml of water, drying over sodium sulphate and filtering, a crystalline product was obtained at −18° C., which was filtered, washed with toluene and recrystallised from toluene. After drying 15 g of 4-(6-methacryloyloxyhexyloxy)benzoic acid were obtained (F: 92° C.).

This product was dissolved in 30 ml of thionyl chloride, combined with a few drops of N,N-dimethylformamide and a little 2,4-di-tert.-butylphenol and converted into the acid chloride by stirring for two hours. After elimination of the excess thionyl chloride, the product was taken up in 25 ml of chloroform and added dropwise at 0° to 5° C. to a stirred solution of 1.85 g of p-anisidine and 3 ml of triethylamine in 50 ml of chloroform. The mixture was stirred for a further 3 hours at room temperature. The solution was washed several times with water, dried over sodium sulphate and the solvent was then distilled off. The reaction product was recrystallised from isopropanol.

Yield: 4.4 g (69% of theoretical) F: 134° to 135° C.

4-(6-methacryloyloxyhexyloxy)-benzoic acid-4-n-pentoxyanilide was produced in a similar manner.

Yield: 4.4 g (71% of theoretical) F: 132° to 133° C.

Example 7

4-(6-methacryloyloxyhexyloxy)-benzoic acid-4-cyanoanilide 12 g of 4-(6-methacryloyloxyhexyloxy)benzoic acid were converted to the acid chloride in a manner similar to example 6. This substance was taken up in 100 ml of benzene and added dropwise at room temperature to a stirred solution of 4.6 g of 4-aminobenzonitrile in 12.5 g of pyridine and 125 ml of benzene. Stirring was continued for a further 3 hours and the reaction mixture left to stand overnight. The precipitate was filtered out and recrystallised from toluene and methanol.

Yield: 10.7 g (67.3% of theoretical) F: 132° to 133° C.

Example 8

4-(6-methacryloyloxyhexyloxy)-benzoic acid-4-n-butoxyphenyl ester 6.1 g of 4-(6-methacryloyloxyhexyloxy)benzoic acid were converted to the acid chloride in a manner similar to example 6. This substance was taken up in 100 ml of tetrahydrofuran (THF) and added dropwise at 0° to 5° C. to a stirred solution of 3.3 g of hydroquinone monobutyl ether in 100 ml of THF and 4 ml of triethylamine. The mixture was stirred for a further 3 hours at room temperature and the triethylamine hydrochloride was then filtered out. The filtrate was evaporated to dryness and the residue dissolved in 50 ml of dichloromethane. The solution was washed several times with water, dried with sodium sulphate and the solvent then distilled off. The crude product so obtained was purified by column chromatography and recrystallisation from n-hexane.

Yield: 6.3 g (66.7% of theoretical) F: 57° to 58° C.

Example 9

4-(2-methacryloyloxyethyloxy)-azobenzene

A mixture of 0.4 mol of 1,2-dibromomethane, 0.2 mol of potassium carbonate, 0.004 mol of 4-hydroxyazobenzene, a trace of potassium iodide and 200 ml of acetone was stirred and refluxed for 6 hours. Once cool, the mixture was filtered. The residue obtained after distilling off the solvent was recrystallised from methanol.

Yield: 8.3 g (68% of theoretical) F: 79° to 85° C.

A mixture of 11.4 g of this product and 0.075 mol of potassium methacrylate was stirred for 10 hours at 60° C. in 100 ml of N,N-dimethylformamide (DMF). Once cool, the mixture was diluted with water, the resultant precipitate filtered out and dried in air. The crude product was purified by column chromatography and recrystallisation from tert.-butanol.

Yield: 8.1 g (70%) F: 65° to 67° C.

B. Copolymerisation and polymer characterisation

Example 10

After thoroughly flushing the reaction vessels and mixtures with nitrogen, a solution of 0.247 g of 4-cyano-4'-(2-methacryloyloxyethyloxy)-diphenyl and 0.076 g of 4-(β'-methacryloyloxy-ethyloxy-ethyl-β-oxy)-4'-cyanoazobenzene in 2.9 ml of absolute benzene was polymerised at 70° C. by the addition of 0.0064 g of azoisobutyronitrile (AIBN) as initiator. Reaction time was 45 hours. The reaction product was precipitated with ethanol, filtered out and dissolved in 1,2-dichloroethane. The solution was refiltered and the polymer obtained was reprecipitated with ethanol and dried and degassed under a vacuum at 120° C. Yield was 95% of theoretical.

Polymers of the formula (IV) were obtained in a similar manner by copolymerisation. The results are shown in table 1.

TABLE 1

| No | x | y | m | n | $R^1$ | $T_g$ (°C.) | Phase | $T_c$ (°C.) |
|---|---|---|---|---|---|---|---|---|
| 1 | 0.6 | 0.4 | 2 | 2 | H | 85 | LC | 106.2 |
| 2 | 0.6 | 0.4 | 2 | 6 | H | 67 | LC | 108.1 |
| 3 | 0.6 | 0.4 | 2 | 2 | $CH_3$ | 107 | LC | 127.7 |
| 4 | 0.6 | 0.4 | 2 | 6 | $CH_3$ | 93 | LC | 118.8 |

$T_g$ is the glass transition temperature, $T_c$ the clarification temperature.

In the "Phase" column, LC means that the polymer concerned develops liquid crystalline phases below $T_c$.

Polymers of the formula (V) were obtained in a similar manner. The results are shown in table 2.

TABLE 2

| No | x | y | n | $R^1$ | $T_g$ (°C.) | Phase | $T_c$ (°C.) |
|---|---|---|---|---|---|---|---|
| 5 | 0.6 | 0.4 | 2 | $CH_3$ | 86 | amorphous | — |
| 6 | 0.8 | 0.2 | 6 | $CH_3$ | 68 | amorphous | — |
| 7 | 0.9 | 0.1 | 6 | $CH_3$ | 66 | amorphous | — |
| 8 | 0.6 | 0.4 | 6 | $CH_3$ | 62 | LC | 86 |

Polymers of the formula (VI) were obtained in a similar manner. The results are shown in table 3.

TABLE 3

| No | x | y | m | $R^1$ | $T_g$ (°C.) | Phase | $T_c$ (°C.) | $M_w$ (10 g/mol) |
|---|---|---|---|---|---|---|---|---|
| 9  | 0.8 | 0.2 | 2 | $CH_3$ | 101 | amorphous | — | 2.12 |
| 10 | 0.6 | 0.4 | 2 | $CH_3$ | 88  | amorphous | — | 1.94 |
| 11 | 0.4 | 0.6 | 2 | $CH_3$ | 77  | amorphous | — | 1.67 |
| 12 | 0.2 | 0.8 | 2 | $CH_3$ | 67  | LC | 89.7  | 1.64 |
| 13 | 0.4 | 0.6 | 6 | $CH_3$ | 57  | LC | 102.4 | — |
| 14 | 0.8 | 0.2 | 2 | H | 77 | LC | 91.3 | 2.20 |
| 15 | 0.6 | 0.4 | 2 | H | 70 | LC | 87.2 | — |
| 16 | 0.4 | 0.6 | 2 | H | 60 | LC | 78.1 | — |
| 17 | 0.2 | 0.8 | 6 | H | 54 | LC | 83.1 | — |
| 18 | 0.4 | 0.6 | 6 | H | 43 | LC | 97.0 | — |

Example 11

After thoroughly flushing the reaction vessels and mixtures with nitrogen, a solution of 1.134 g of 4-(6-methacryloyl-oxyhexyloxy)-benzoic acid-4-n-methoxyanilide and 0.776 g of 4-(2-methacryloyloxyethyloxy)-azobenzene in 19 ml of DMF was polymerised at 70° C. by the addition of 0.164 g of AIBN as initiator. Reaction time was 24 hours.

The reaction product was precipitated with 500 ml of ethanol, filtered out and dissolved in 20 ml of DMF. The solution was refiltered and the polymer obtained was reprecipitated with ethanol and dried and degassed under a vacuum at 120° C. Yield was 1.34 g (70% of theoretical).

Polymers of the formula (VII) were obtained in a similar manner. The results are shown in table 4.

TABLE 4

| No | x | y | $R^2$ | $T_g$ (°C.) | Phase | $T_c$ (°C.) | $M_w$ ($10^4$ g/mol) | $M_w/M_n$ |
|---|---|---|---|---|---|---|---|---|
| 19 | 0.7  | 0.3  | $OC_5H_{11}$ | 75 | LC | 102 | 9.4 | 2.95 |
| 20 | 0.5  | 0.5  | $OC_5H_{11}$ | 81 | amorphous | — | 8.7 | 2.80 |
| 21 | 0.76 | 0.24 | CN | 97 | amorphous | — | 183.7* | 17.30* |

*The values obtained under the stated measuring conditions are increased by aggregation.

Polymers of the formula (VIII) were obtained in a similar manner. The values are shown in table 5.

TABLE 5

| No | x | y | $T_g$ (°C.) | Phase | $T_c$ (°C.) |
|---|---|---|---|---|---|
| 22 | 0.7 | 0.3 | 55 | LC | 89 |
| 23 | 0.6 | 0.4 | 59 | LC | 83 |
| 24 | 0.5 | 0.5 | 63 | amorphous | — |
| 25 | 0.4 | 0.6 | 64 | amorphous | — |

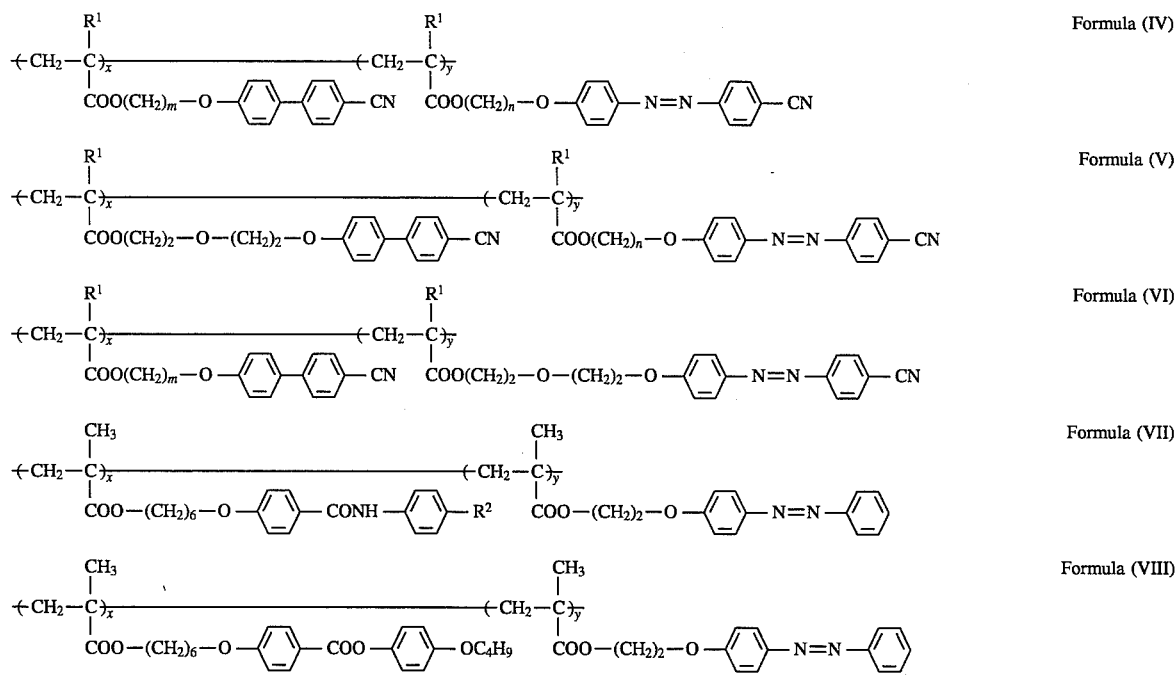

Formula (IV), Formula (V), Formula (VI), Formula (VII), Formula (VIII)

Example 12

The composition of the copolymers obtained was ascertained by elemental analysis and UV/vis spectroscopy.

The number average $M_n$ and weight average $M_w$ molecular weights were determined by GPC measurements. The stated values are relative values related to a polystyrene standard measured under the same conditions. The $M_n$ values were additionally determined by membrane osmometry.

The phase transition temperatures were determined, or the absence of thermotropic mesophases proven, by examination under a polarising microscope and DSC measurements. The latter measurements were also used to determine the glass transition temperatures.

C) Preparation of amorphous films

Example 13

Two sheets of glass were maintained at a separation of 15 μm with a polyimide film and fixed with epoxy resin.

A melt of the amorphous polymer 5 was introduced between the sheets under the action of capillary forces at 150° C.

After cooling to room temperature, a transparent, completely optically clear, void free, non-scattering film which was optically isotropic in all spatial directions was obtained.

This amorphous structure exhibited no birefringence nor any domain structure under a polarising microscope. Conoscopic examination also revealed that the film was optically isotropic and thus amorphous.

This result was also confirmed by polarised UV/vis measurements and by polarised IR measurement. The "degree of order" of the polymer determined in this manner was 0.

Films of polymers 6, 7, 9 to 11, 20 and 21 with the described properties were obtained in a similar manner.

Example 14

A melt of polymer 1 was introduced under the action of capillary forces at 150° C. between sheets prepared as in example 13.

After sudden cooling to room temperature, a transparent, completely optically clear, void free, non-scattering film which was optically isotropic in all spatial directions was obtained.

This amorphous structure exhibited no birefringence nor any domain structure under a polarising microscope. Conoscopic examination also revealed that the film was optically isotropic and thus amorphous.

This result was also confirmed by polarised UV/vis measurements and by polarised IR measurement. The "degree of order" of the polymer determined in this manner was 0.

Films of polymers 2 to 4, 8 and 12 to 19 with the described properties were obtained in a similar manner.

Example 15

Amorphous films of polymer 19 were spin-coated onto silica glass and silicon substrates.

A 4 wt. % solution of the polymer in THF was filtered through a sintered filter with a pore size of 10 μm.

The silica glass sheets and silicon wafers used as substrates for the film were rinsed with THF before coating in the spin-coater.

The solutions of the polymer were applied to the stationary substrate, which was then set in rotation (5,000 rpm; time approx. 1 min).

The films were stored for 10 hours in the dark under a stream of gas containing no solvents.

In this manner, transparent, completely optically clear films were obtained which exhibited neither domain structure nor birefringence under a polarising microscope. Conoscopic examinations revealed that the films were optically isotropic and thus amorphous. Polarised UV/vis measurements (glass substrates) or FTIR measurements (Si substrates) confirmed this finding. FTIR means Fourier Transform Infra-Red spectroscopy.

Film thickness was measured with a Talystep device. Thickness was approx. 500 nm.

Films of polymers 1 to 19 and 20 to 24 with the stated properties were obtained in a similar manner on silica glass and silicon substrates. Film thickness was adjusted within the range 400 to 1000 nm by selecting concentration and rotational speed.

Example 16

A amorphous film of polymer 20 was produced from a 20 wt. % filtered solution of the polymer in THF.

A silica glass substrate was coated with this solution such that it was homogeneously wetted without bubbles. The solvent was then slowly evaporated off and the sheets stored for 10 hours in the dark under a stream of gas containing no solvents.

Film thickness was approximately 5 μm. The film was optically clear and exhibited neither domain structure nor birefringence under a polarising microscope. Conoscopic examination revealed that the film was optically isotropic and thus amorphous. Polarised UV/vis measurements confirmed this finding.

D) Interaction of the amorphous films with actinic light

Example 17

Polymer 19 was irradiated in a cell produced as in example 14 with linearly polarised light from an Ar+ laser ($\lambda$=488 nm, P=100 mW/cm$^2$). UV/vis spectra were recorded during irradiation with a measuring beam parallel and perpendicular to the plane of polarisation of the excitation light. It was established in this manner that a constant ratio of E and Z isomers of the azobenzene chromophores is achieved after approx. 7 seconds which is not changed by further irradiation (photostationary equilibrium). The detected dichroism of the band attributable to the E isomers (r=$A_\parallel$ 365 nm/$A_\perp$ 365 nm) rose continuously during a period of irradiation of 300 seconds from r=1 to r=1.9, $A_\parallel$ 365 nm means absorption in the perpendicular direction and $A_\perp$ 365 nm means absorption parallel to the plane of polarisation of the Ar+ laser. This demonstrates that a continuous reorientation of the photochromic groups occurs during irradiation with linearly polarised light, which leads to the formation of a preferred orientation in the plane of the film.

All the other polymers exhibit qualitatively similar behaviour under these conditions.

Example 18

Polymer 20 was irradiated in a cell produced as in example 13 with unpolarised light from an Ar+ laser ($\lambda$=488 P=100 mW/cm$^2$). UV/vis spectra were recorded during irradiation with measuring rays polarised in three directions (horizontal, vertical and 45° to horizontal). In the range of the bands attributable to the E isomers, absorption was in each case independent of the direction of polarisation of the measuring ray. The sum of all three absorptions decreased continuously during the 300 second duration of irradiation. This demonstrates that continuous reorientation of the photochromic groups occurs on irradiation with unpolarised light which leads to the formation of a preferred orientation perpendicular to the film plane.

Example 19

Polymer 21, in the form of a layer on a Si substrate produced as in example 15, was irradiated with linearly polarised light from an $Ar^+$ laser ($\lambda$=488 nm, P=100 mW/cm$^2$). FTIR spectra were recorded during irradiation with a measuring beam polarised parallel and perpendicular to the plane of polarisation of the excitation light. The dichroism of the bands attributable to the CN stretching vibration of the cyano group of the conformationally anisotropic side group detected in this manner rose continuously during an irradiation period of 300 seconds from r=1 to r=1.9, wherein r=$A_\parallel/A_\perp$ and $A_\parallel$ represents the integral of the CN bands with the measuring beam polarised perpendicular and $A_\perp$ represents the integral of the CN bands with the measuring beam polarised parallel to the excitation light. This demonstrates that a continuous, identically directed reorientation of the conformationally anisotropic, non-photochromic side groups up to a maximum of perpendicular to the plane of polarisation of the excitation light occurs on irradiation with linearly polarised light due to a cooperative effect. Qualitatively identical behaviour was found for all the other polymers.

This cooperative effect, in combination with the specific structure of the polymers, brings about, in comparison with other amorphous polymers, particularly high inducible birefringence values of up to 0.11, which have previously been observed only as a result of macroscopic reorientation processes by external fields in liquid crystals.

Example 20

Amorphous films of polymers 5 to 7, 10, 11 and 20 to 25 produced according to practical example 13 and amorphous films of polymers 1 to 4, 8 and 12 to 19 produced according to practical example 14 were irradiated in the glassy state with an expanded beam (d=10 mm) of linearly polarised light from an $Ar^+$ laser ($\lambda$=488 nm; P=200 mW/cm$^2$).

Birefringence in the film plane was measured during irradiation using a He/Ne laser ($\lambda$=632.8 nm; P=0.5 mW/cm$^2$). Birefringence rose continuously from $\Delta n$=0 (amorphous film) towards a limit value $\Delta n_{max}$. The level of the limit value and the irradiation period required to achieve it was dependent upon polymer structure, film temperature, film thickness and irradiation power.

By way of example, table 6 summarises the achieved birefringence limit values and the calculated time constants for some of the experiments which were performed.

TABLE 6

| Polymer | P (mW/cm$^2$) | $\partial$ (°C.) | $\Delta n_{max}$ | $\tau$ (s)* |
|---|---|---|---|---|
| 1 | 200 | 20 | 0.065 ± 0.005 | 40 ± 3 |
| 2 | 200 | 20 | 0.053 ± 0.002 | 66 ± 3 |
| 3 | 200 | 20 | 0.066 ± 0.002 | 50 ± 2 |
| 4 | 200 | 20 | 0.052 ± 0.002 | 150 ± 20 |

TABLE 6-continued

| Polymer | P (mW/cm$^2$) | $\partial$ (°C.) | $\Delta n_{max}$ | $\tau$ (s)* |
|---|---|---|---|---|
| 5 | 200 | 20 | 0.047 ± 0.004 | 30 ± 3 |
| 6 | 200 | 20 | 0.039 ± 0.001 | 210 ± 10 |
| 7 | 200 | 20 | 0.033 ± 0.002 | 1400 ± 100 |
| 8 | 200 | 20 | 0.053 ± 0.002 | 105 ± 5 |
| 9 | 200 | 20 | 0.040 ± 0.003 | 120 ± 20 |
| 10 | 200 | 20 | 0.050 ± 0.002 | 52 ± 4 |
| 11 | 200 | 20 | 0.080 ± 0.004 | 29 ± 3 |
| 12 | 200 | 20 | 0.081 ± 0.007 | 9 ± 1 |
| 13 | 200 | 20 | 0.065 ± 0.007 | 47 ± 4 |
| 14 | 200 | 20 | 0.058 ± 0.003 | 140 ± 14 |
| 15 | 200 | 20 | 0.078 ± 0.004 | 50 ± 5 |
| 16 | 200 | 20 | 0.087 ± 0.004 | 32 ± 4 |
| 17 | 200 | 20 | 0.110 ± 0.010 | 14 ± 2 |
| 18 | 200 | 20 | 0.110 ± 0.010 | 63 ± 10 |
| 19 | 200 | 20 | 0.020 ± 0.003 | 1280 ± 100 |
| 19 | 200 | 50 | 0.040 ± 0.004 | 240 ± 20 |
| 20 | 200 | 20 | 0.025 ± 0.002 | 550 ± 50 |
| 20 | 200 | 50 | 0.040 ± 0.005 | 240 ± 20 |
| 21 | 200 | 20 | 0.025 ± 0.002 | 320 ± 30 |
| 21 | 200 | 50 | 0.040 ± 0.005 | 150 ± 10 |

*The $\tau$ values are constants which arise from a fit of the dependence of induced birefringence upon irradiation time according to the monoexponential statement $\Delta n(t) = \Delta n_{max}* (1-e^{-(t/\tau)})$.

After irradiation, there was a slight relaxation of the birefringence values from $\Delta n_{max}$ to $\Delta n_{stab}$, wherein the following always applied $$(\Delta n_{max} - \Delta n_{stab})/\Delta n_{max} < 0.05$$

if $T_g-T$ was>10K. The $\Delta n_{stab}$ values remained constant over three years' storage at temperatures below $T_g$.

It was possible to demonstrate by microscopic examination that the induced anisotropy was constant over the entire irradiated surface.

Conoscopic examination of the irradiated film showed that an optical axis was induced in the film plane which axis was perpendicular to the plane of polarisation of the actinic light.

Example 21

Ten amorphous films of polymer 20 produced according to practical example 13 were irradiated under the conditions described in example 20 with 10 different directions of the plane of polarisation. In each case, an optical axis was produced in the amorphous films which was perpendicular to the plane of polarisation of the excitation light. The degree of induced birefringence relative to this axis was, under otherwise identical irradiation conditions, independent of the direction of the plane of polarisation of the excitation light. This demonstrates that the direction of the axes of optical anisotropy may be freely adjusted by selection of the plane of polarisation of the excitation light in relation to the polymer structure.

Example 22

A 15 µm thick film of polymer 19 prepared as described in example 14 was irradiated with an expanded beam (d=10 mm) of linearly polarised light from an $Ar^+$ laser ($\lambda$=488 nm; P=200 mW/cm$^2$). Birefringence was measured during irradiation. Irradiation was interrupted once a change in birefringence of 0.0004 had been achieved birefringence was allowed to stabilise after slight relaxation and irradiation was then continued. After 100 such cycles, birefringence of 0.04 was achieved. This demonstrates that the extent of orientation of the initially amorphous structure is dependent upon the duration of irradiation and is thus freely adjustable.

Example 23

Eight 15 μm thick films of polymer 20 prepared as in example 13 were each irradiated with an expanded beam (d=10 mm) of linearly polarised light from an $Ar^+$ laser (λ=488 nm) for 300 seconds. The power of the laser was varied. The various degrees of birefringence so induced are shown in the following table:

| P mW/cm$^2$ | 1 | 2 | 5 | 10 | 20 | 50 | 100 | 200 |
|---|---|---|---|---|---|---|---|---|
| Δn | 0.0002 | 0.0004 | 0.0008 | 0.002 | 0.006 | 0.02 | 0.04 | 0.06 |

This demonstrates that the extent of orientation in the originally amorphous structure is dependent upon the power of the excitation light and is thus freely adjustable.

Example 24

Two 15 μm thick films of polymer 19 prepared as in example 14 were each irradiated with an expanded beam (d=10 mm) of linearly polarised light from an $Ar^+$ laser (λ=488 nm) until induced birefringence of Δn=0.02 was achieved. The first film was irradiated at room temperature (approx. 45K below glass transition temperature). Irradiation lasting approx. 350 seconds was required to induce the desired birefringence. The second film was heated to 80° C. (approx. 10K above glass transition temperature) immediately after the beginning of irradiation. In this case, induction of the desired birefringence required only approx. 70 seconds. This film was cooled to room temperature while irradiation was still under way, such that the relaxation on termination of irradiation was as described in example 20. This demonstrates that optical anisotropy is written at temperatures below the glass transition temperature or transiently above the glass transition temperature and is frozen into the glassy state.

E) Purposeful modification of the optical properties of the polymer structures as a pre-requisite for use in digital optical data storage

Example 25

A 15 μm thick film of polymer 19 prepared as in example 14 was irradiated at room temperature with a linearly polarised beam of light from an $Ar^+$ laser (λ=488 nm; P=100 mW/cm$^2$, d=1 mm) in ten different areas for differing lengths of time. The induced birefringence was measured. The film was then heated to above its glass transition temperature and cooled back down to room temperature. Irradiation was then repeated under the same conditions. For the same irradiation time, the birefringence values achieved in each case deviated from each other by at most 2% of the absolute value. This demonstrates that reproducible, defined birefringence is induced in the polymer, which, if two polarisers in a defined position relative to each other and to the polymer film are used, gives rise to a defined, readable contrast in comparison with the unirradiated polymer film.

Example 26

A 15 μm thick film of polymer 20 prepared as in example 13 was irradiated at room temperature with a linearly polarised beam of light from an $Ar^+$ laser (λ=488 nm; P=100 mW/cm$^2$, d=1 mm) in ten different areas with ten different directions of the plane of polarisation (10° steps from horizontal to vertical) for 300 seconds in each case. The polymer film was located between two crossed polarisers. The intensity of a He/Ne laser beam passing perpendicularly through this arrangement was measured. The film was then heated to above the glass transition temperature and cooled back down to room temperature. Irradiation was then repeated under the same conditions. This procedure was performed 10 times in succession. The intensities of the He/Ne laser beam measured after each irradiation of the same areas deviated by at most 2%. This demonstrates that reproducible, defined birefringence is induced in the polymer, which, if two polarisers in a defined position relative to each other and to the polymer film are used, gives rise to a defined, readable contrast in comparison with the unirradiated polymer film and with areas irradiated with other planes of polarisation.

Example 27

A 15 μm thick film of polymer 19 prepared as in example 14 was irradiated at room temperature with a linearly polarised beam of light from an $Ar^+$ laser (λ=488 nm; P=100 mw/cm$^2$, d=1 mm) for ten different lengths of time. After each irradiation, the absorption anisotropy was measured by UV/vis spectroscopy, the polymer film heated to above its glass transition temperature and cooled back down to room temperature. The next irradiation was then performed. The ten cycles were repeated three times. It was established that the absorption values measured at each direction of polarisation of the measuring beam deviated by at most 2%. Absorption anisotropy grew as the duration of irradiation increased. This growth closely matched the increase in birefringence with an increasing duration of irradiation (see example 22). After the last irradiation, the polymer film was stored for 6 months in the dark at room temperature without any significant change in absorption anisotropy. This demonstrates that reproducible, defined, continuously variable, durable absorption dichroism is induced.

Example 28

A 15 μm thick film of polymer 20 prepared as in example 13 was irradiated at room temperature with a linearly polarised beam of light from an $Ar^+$ laser (λ=488 nm; P=100 mW/cm$^2$, d=10 mm) ten times with different polarisation directions for 300 seconds. The polarisation directions were the same as in example 26. After each irradiation, absorption anisotropy was determined by UV/vis spectrometry, the polymer film heated to above its glass transition temperature and cooled back down to room temperature. The next irradiation was then performed. The ten cycles were repeated three times. It was established that the absorption anisotropy values measured for all 40 irradiations deviated by at most 2%. The direction of maximum absorption was in each case perpendicular to the polarisation direction of the excitation light, the direction of minimum absorption parallel to it. No dichroism could be detected before the first irradiation and after the polymer film was heated and then cooled. This demonstrates that reproducible, defined absorption dichroism is induced in the polymers, which is read in transmission as a defined absorption anisotropy of the polymer film and which differs from the dichroism of the unirradiated polymer film or of areas irradiated with other polarisation directions.

Example 29

A 15 µm thick film of polymer 19 prepared as in example 14 was irradiated at room temperature with a linearly polarised beam of light from an $Ar^+$ laser ($\lambda$=488 nm; P=100 mW/cm$^2$, d=10 mm) ten times with different polarisation directions for 300 seconds. After each irradiation, induced birefringence was measured and the polymer film examined orthoscopically and conoscopically under a microscope. The film was then heated to above its glass transition temperature and cooled back down to room temperature. Irradiation was then repeated under the same conditions with a direction of polarisation altered by 10°. The birefringence value and microscopic appearance of the film was constant over the entire irradiated area. After each irradiation, the optical properties of the polymer film differed only in the direction of the induced optical anisotropy which corresponded to the selected direction of the plane of polarisation of the excitation light. This demonstrates that uniform irradiation conditions can induce uniform orientation in the entire polymer film.

Example 30

100 different points of a film of polymer 19 prepared as described in example 14 were irradiated for different lengths of time with a linearly polarised beam of light from an $Ar^+$ laser ($\lambda$=488 nm; P=100 mW/cm$^2$, d=10 µm). Pixels of differing birefringence values were produced. The irradiation times were selected such that the $\Delta n$ values already stated in example 22 were achieved. This demonstrates that a film is produced which is structured with regard to the local preferred orientation of the side groups by pixel-by-pixel variation of the duration of irradiation.

Example 31

An array of 8×8 dots (each of diameter 10 µm) was irradiated pixel-by-pixel onto a film of polymer 19 prepared as in example 13 with a linearly polarised beam of light from an $Ar^+$ laser ($\lambda$=488 nm) for 300 seconds each. In the first row of the array, the points were irradiated left to right in sequence with a power of 1, 2, 5, 10, 20, 50, 100 and 200 mW/cm$^2$. In the second row, the sequence 2, 5, 10, 20, 50, 100, 200, 1 mW/cm$^2$ was selected etc. until finally the eighth row was irradiated with the sequence 200, 1, 2, 5, 10, 20, 50 and 100 mW/cm$^2$. A pixel pattern was produced, wherein the birefringence of the individual pixels corresponded to the values stated in example 23 for the particular laser power.

This demonstrates that a film is produced which is structured with regard to a local preferred orientation of the side groups by pixel-by-pixel variation of irradiation intensity.

Example 32

Ten pixels of a film of polymer 19 prepared as described in example 13 were irradiated with light ($\lambda$=488 nm, P=100 mW/cm$^2$, $T_{irr}$=300 sec) in each case with a different polarisation direction in relation to the sample (0° to 90° in 10° steps), so producing pixels with a different preferred direction in the film plane which, under orthoscopic examination, each displayed different extinction and intensification behaviour corresponding to their orientation in relation to the rotation between the polarisers. This demonstrates that a film is produced which is structured with regard to a local preferred orientation of the side groups by pixel-by-pixel variation of the direction of polarisation of the excitation light.

Example 33

All the anisotropic orientation distributions induced by irradiation in examples 20 to 32 could be eradicated by heating the polymers to above their glass transition temperature and subsequent cooling (amorphous polymers) or by heating to above the clarification point and sudden cooling to below the glass transition temperature (liquid crystalline polymers). After this treatment, the polymer structures no longer differ in terms of their spectroscopic and microscopic properties from their state before irradiation. Half of the pixels produced in example 32 were eradicated by heating with $CO_2$ laser irradiation ($\lambda$=1060 nm, P=1 W/cm$^2$, $t_{irr}$=5 s). The result was a uniformly isotropic film with the five birefringent pixels not irradiated with the $CO_2$ laser. This demonstrates that the entirety or individual pixels of the induced orientation may be eradicated by areal or local heating, wherein the requisite energy may be supplied either directly or by means of an appropriate light source, and the original state may thus be recreated.

Example 34

The pixels not erased by irradiation with the $CO_2$ laser as described in example 33, which had been produced as described in example 32, were irradiated with an unpolarised beam of light from an $Ar^+$ laser ($\lambda$=488 nm, P=300 mW/cm$^2$, $t_{irr}$=300 s). After this irradiation the pixels exhibited no birefringent properties when irradiated perpendicularly. This demonstrates that primarily induced preferred directions are cancelled by irradiation with unpolarised actinic light and the film again becomes optically isotropic along the normals.

Example 35

A 15 µm thick film of polymer 20 prepared as in example 13 was irradiated at room temperature with a linearly polarised beam of light from an $Ar^+$ laser ($\lambda$=488 nm; P=100 mW/cm$^2$, d=10 mm) for 300 seconds. Birefringence of 0.04 was induced in this manner. The optical axis induced in the polymer film was perpendicular to the plane of polarisation of the excitation light. The plane of polarisation of the excitation light was then rotated by 40° and irradiation again performed for 300 seconds. Birefringence of 0.04 was induced, wherein the induced optical axis was perpendicular to the plane of polarisation of the excitation light, i.e. rotated by 45° in relation to the result of the first irradiation. The plane of polarisation of the excitation light was then again rotated by 45° in the same direction and irradiation again performed for 300 seconds. The result was birefringence of 0.04, wherein the induced optical axis was perpendicular to that induced on the first irradiation. By rotating the plane of polarisation of the excitation light by 30° followed by 300 seconds' irradiation three times in succession, the optical axis of the polymer film was returned, via two intermediate positions, to the position after the first irradiation. The same stages were then repeated with a constant direction of the plane of polarisation of the excitation light by rotating the polymer film around an axis parallel to the propagation direction of the light. Both procedures produced identical results. This demonstrated that it is possible to switch repeatedly between different preferred directions and thus modify optical anisotropy by repeated irradiation with light from the same source but with a different plane of polarisation or by changing the position of the polymer film in relation to the plane of polarisation of the write light.

Example 36

100 different points of a film of polymer 20 prepared as described in example 14 were irradiated with a beam of linearly polarised light from an $Ar^+$ laser ($\lambda$=488 nm; P=100 mW/cm$^2$, d=10 µm) for different periods of time. Pixels with differing birefringence values were produced. Irradiation times were selected such that 100 discrete phase shift values for light of wavelength 632.8 nm were produced in the 10 µm thick film, which values ranged from complete extinction to complete transparency of the sample between crossed polarisers. Scanning the polymer film with a beam from a He/Ne laser produced the intensity values for the individual pixels 0.01 $I_0$, 0.02 $I_0$, 0.03 $I_0$ ... 0.98 $I_0$, 0.99 $I_0$, $I_0$, wherein $I_0$ is the measured intensity of the laser after passing through the amorphous film between parallel polarisers. This demonstrates that up to 100 different readable grey levels may be reproducibly written in one pixel.

Example 37

A film of polymer 19 produced as described in example 13 was irradiated at ten different points with a laser beam tapered to 100 µm ($\lambda$=488 nm; P=200 mW/cm$^2$) for a constant period ($t_{irr}$=300 s) in order to achieve pixel-by-pixel structuring.

This produced ten pixels with identical birefringence values which, on orthoscopic and conoscopic examination, exhibited identical behaviour when rotated between crossed polarisers.

F) Storage of image information

Example 38

Image information was stored using a test mask in a film of polymer 1 produced as described in example 13 and in a film of polymer 20 produced as described in example 16.

To this end, the test mask (line pair pattern) was attached to the prepared polymer so that it was uniformly applied (contact transfer).

The image information contained in the mask was stored by irradiation with linearly polarised actinic light from an $Ar^+$ ion laser ($\lambda$=488 nm; P=100 mw/cm$^2$), the beam being expanded in relation to the image orientation such than the surface of the pattern was uniformly irradiated.

Irradiation time was 3 minutes, the film temperature was 10K below the glass transition temperature of the polymer concerned.

After irradiation, the information written in the film was examined under a polarising microscope. Resolution of 2 µm could be achieved without any problem.

Example 39

Image information was stored as in example 38 with the difference that a photographic negative was used instead of the test mask.

The written images were visible between crossed polarisers as a negative image (similar to the original) and between parallel polarisers as a positive image. The written information exhibited a continuous grey scale corresponding to the original. This shows that any desired birefringence value between 0 and $\Delta n_{max}$ may be achieved depending upon the effective dose of radiation.

The written images have been stable for in excess of one year.

G) Production of anisotropic optical components

Example 40

A film of polymer 20 prepared as described in example 14 (film thickness 10 µm) was used to produce passive anisotropic optical components.

The material was irradiated with a linearly polarised expanded beam of an $Ar^+$ ion laser (P=100 mW/cm$^2$) until the birefringence at 633 nm produced by the photoinduced orientation of the amorphous film brings about a phase shift of $\lambda$/4 or $\lambda$/2.

In this manner, it was possible to rotate the position of the plane of polarisation of the linearly polarised non-actinic light by 90° ($\lambda$/2) or to produce circularly polarised light from linearly polarised light ($\lambda$/4). These results were verified by analyser intensity measurements.

H) Measuring principles

Example 41

The anisotropy induced in the polymer films in practical examples 20 to 26, 29 to 31, 35 and 38 was detected during irradiation by measuring the phase shift of a beam from a He/Ne laser (P=1 mW/cm$^2$, $\lambda$=633 nm, beam diameter d=0.5 mm) passing perpendicularly through the film. The plane of polarisation of the measuring light formed the median line between the two main axes of the induced anisotropy.

The intensity of the measuring beam was measured after passing through an analyser for each of four polarisation positions (0° and 90° and +/–45°). Intensity losses due to light scattering were eliminated from the measured intensities and phase shift and birefringence calculated using Fresnel's formula.

Example 42

The image information stored in the polymer films according to practical examples 38 and 39 (test mask, photographic negative) were projected flat onto a screen with non-actinic linearly polarised light from an expanded He/Ne laser ($\lambda$=633 nm, P=$10^{-3}$ mW/cm$^2$) after passing through an analyser.

Depending on the position of the polarisers relative to each other (0° or 90°), the positive or negative images respectively of the mask or photograph could be produced.

I) Cyclic reversibility

Example 43

The refractive index anisotropy of a film of polymer 10 produced according to example 13 and areally oriented according to example 29 was cycled between –0.01 and +0.01 relative to a fixed system of coordinates by irradiation with an argon ion laser ($\lambda$=488 nm, P=200 mW/cm$^2$, t=90 s) with a plane of polarisation rotated in each case by 90°. The time profile of the phase shift and the maximum and minimum transmission values of the He/Ne laser through the polariser/film/analyser arrangement was reproducible over 150 cycles with a deviation of less than 5%.

In a further experiment, irradiation was interrupted at a point in the cycle where the film exhibited no birefringence. This is equivalent to a photonic erasure of the stored erasure.

If, after such an interruption, irradiation was restarted with a plane of polarisation of the actinic light rotated by 90°, it was possible to recreate the birefringence which the film had exhibited before the preceding irradiation (0.01 or −0.01).

This proves the high cyclic reversibility of the claimed systems and demonstrates the possibility of achieving reversible optical data storage media and optically switchable anisotropic optical components based on these systems.

K) Other sources of actinic light

Example 44

Areal orientation of the amorphous polymer films according to example 29 was achieved by irradiation with linearly polarised light from a mercury discharge lamp (λ=365 nm).

Example 45

Pixel-by-pixel orientation of the amorphous polymer films according to example 33 and cyclic switching of pixels between different orientation states according to example 43 was achieved by irradiation under a polarising microscope (100 W halogen lamp as source of actinic radiation) using a sharp cut-off filter for the UV content.

L) Photosensitivity of the polymers

Example 46

In order to assess sensitivity, a film of polymers 10 and 11 prepared according to example 14 and a film of polymer 12 prepared according to example 13 were irradiated with linearly polarised light from an $Ar^+$ ion laser (λ=488 nm; P=250 mW/cm$^2$), until the He/Ne laser light underwent a phase shift of Δf=π/6. The times required to achieve this were measured and are shown in the table below together with the resultant energy doses.

| Polymer | 10 | 11 | 12 |
|---|---|---|---|
| t (π/6)/s | 10.5 | 5.3 | 2.3 |
| E = t P/Jcm$^{-2}$ | 2.6 | 1.3 | 0.6 |

Example 47

In order further to evaluate the sensitivity of the polymers, a process was used which produces data used to characterise the sensitivity of customary photographic films. This process takes account of the specific effects underlying the photographic utility of the claimed polymers and thus differs from the process used for customary films.

To this end, the polymer films investigated in example 46 were irradiated under the conditions described in that example until a phase shift of π/2 was achieved. Transmission of the He/Ne laser through the polariser/polymer film/analyser system (polariser and analyser are crossed; direction of polarisation of write light is the median line) was measured and its decimal logarithm (log I/I$_0$) plotted against the decimal logarithm of the energy dose (log E). Before irradiation log (I/I$_0$)$_{E=0}$ was −2. When evaluating photographic films, this value is described as grey haze. The same value was derived from a measurement of intensity without a polymer film between the polarising films. The value is thus determined by the quality (degree of polarisation) of these films.

During irradiation, log (I/I$_0$) rose virtually linearly to 0. The energy required to produce a change in log (I/I$_0$) above the background noise was then determined. By definition this is a change from {log(I/I$_0$)}$_{E=0}$ to {log(I/I$_0$)}$_{E=0}$ +0.1. This energy dose H* is used in sensitometric testing of photographic films to calculate sensitivity S=1/H*, The following table shows the values of H* and S for the three polymers investigated.

| Polymer | 10 | 11 | 12 |
|---|---|---|---|
| H* [Jcm$^{-2}$] | 0.59 | 0.40 | 0.19 |
| S [cm$^2$J$^{-1}$] | 1.7 | 2.5 | 5.2 |

We claim:

1. An amorphous film material made from a side group polymer with a backbone and side groups branching off the backbone, which polymer has the following structural features (1) to (3):

(1) the side group polymer contains at least one photoinducibly configuration-changing side group;

(2) the side group polymer contains at least one permanently conformationally anisotropic side group with anisotropy of molecular polarisability which differs from (1);

(3) the side group polymer contains at least two different flexible spacer groups of differing length between the backbone and the side groups (1) and (2);

wherein the amorphous film material in the glassy state of the side group polymers is optically isotropic, transparent, non-scattering and amorphous before irradiation and, after irradiation, is transparent and durably birefringment and dichroic due to a reversible, photoinduced alignment of the side groups (1) and (2) in the glassy state and said backbone is a poly(meth)acrylate, a polysiloxane, a poly-α-oxirane, a polyether, a polyamide, a polyurethane, a polyester or a polycarbonate, the side group (1), including the flexible spacer group (3), corresponds to the formula (I) and the side group (2), including the flexible spacer group (3), corresponds to the formula (II):

$$-S_1-Q_1-P-X_1 \qquad (I)$$

$$-S_2-Q_2-M-X_2 \qquad (II)$$

in which $S_1$ and $S_2$ mean a spacer group, $Q_1$ and $Q_2$ mean —O—, —CO—O—, —O—CO—, —CO—NR$_1$—, —NR$_1$—CO— or —NR$_1$—, P means a photoinducibly configuration-changing group, M means a permanently conformationally anisotropic group differing from P, $X_1$ and $X_2$ mean a terminal substituent and $R_1$ means hydrogen or $C_1$–$C_4$ alkyl.

2. The film material according to claim 1, further comprising at least one structural feature (4) selected from the group (a) to (f):

(a) the spacer groups (3) have heteroatoms;

(b) the spacer groups (3) are branched;

(c) the side groups (1) or (2) are branched;

(d) the side groups (1) or (2) are terminated with branched end groups;

(e) the monomer units of the side group polymer do not form liquid crystalline phases;

(f) the side group polymer contains further side groups (5) which do not exhibit permanent conformational anisotropy.

3. The film material made from a side group polymer according to claim 1, wherein the backbone of the side group monomers is formed of monomers bearing the side groups (1) via a spacer group (3), of monomers bearing the side groups (2) via spacer groups (3) and optionally further monomers.

4. The film material made from a side group polymer according to claim 3, wherein the proportion of monomers with side group (1) is 10 to 80 mol %, the proportion of monomers with side group (2) is 20 to 90 mol % and the proportion of further monomers is 0 to 50 mol %.

5. The film material made from side group polymer according to claim 1, wherein $S_1$ and $S_2$ mean a group —$(CH_2)_n$—, optionally interrupted with —O—, —NH— or —$Si(R_5)_2$—, n means 2 to 14, P means —Ar(N=N—Ar)$_m$—, —Ar—$CR_2$=$CR_3$—$COOR_4$—, —Ar—(CH=CH—Ar)$_m$, —ArCR$_2$=CR$_3$—Ar—, —Ar—CR$_2$=CR$_3$—COR$_4$— or —Ar—CR$_2$=CR$_3$— cyclohexyl—, $R_2$, $R_3$ and $R_4$ mean H, $C_1$-$C_4$-alkyl, CN, $OR_2$, halogen, $NO_2$ or $N(R_5)_2$, $R_5$ means H or $C_1$-$C_4$ alkyl, Ar means an optionally substituted aromatic ring system with 5 or 6 ring members, m means 1 or 2, M means one of the groups —Ar—Ar—, —Ar—Y—Ar—, —Ar—Y—Alk—, —Alk—Y—Ar—, —Alk—Ar— or —Ar—Alk—, Y means —CO—O—, —OCO—, —CONH—, —NHCO—, —N=NO—, —C(R$_5$)$_2$—, —C(R$_5$)$_2$—C(R$_5$)$_2$—, —O— or —NR$_1$—, Alk means an unbranched, branched or cyclic, optionally substituted, optionally olefinically unsaturated aliphatic group with 1 to 14 C atoms, $X_1$ and $X_2$ mean hydrogen, CN, Alk, Y—Alk, aryl, Y—Ar, —N(Alk)$_2$, halogen or NO$_2$.

6. The film material made from a side group polymer according to claim 1, wherein the backbone is a poly(meth)acrylate, P means —Ar—(N=N—Ar)$_m$, —Ar—CR$_2$=CR$_3$—Ar— or —Ar—CR$_2$=CR$_3$—COOR$_4$, M means a residue of a biphenyl, benzoic acid anilide or a benzoic acid phenyl ester, $X_1$, $X_2$ mean H, CN, $C_1$-$C_8$ alkyl, $C_1$-$C_8$-alkoxy, $C_5$-$C_7$ cycloalkoxy, phenyl, phenoxy, $C_1$-$C_4$ dialkylamino or nitro.

7. The Film material made from side group polymers according to claim 1, wherein the side group polymers have a glass transition temperature $T_g$ of $\geq 40°$ C.

8. The film material made from a side group polymer according to claim 1, wherein weak interactive forces arise between side groups (1) and (2) which are sufficient to ensure that a photoinduced configuration change of side group 1 brings about a reorientation of side group 2.

9. The film material according to claim 8, wherein the photoinduced configuration change of side group 1 and the reorientation of side group 2 bring about a change in birefringence of $\Delta n=0.01$ to 0.2.

10. The film material according to claim 1, produced by casting an isotropic melt of a side group polymer according to claim 1 and cooling at a rate of >100K/min.

11. Process for generating and modifying ordered states and for modulating the optical properties of the film materials according to claim 1 comprising acting light upon the film materials.

12. Process according to claim 11, wherein, depending on the effect to be achieved, the light is linearly or circularly polarised or unpolarised light of a wavelength range absorbed by side group (1).

13. Side group polymers of the formula

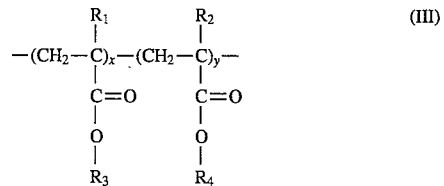

in which $R_1$ and $R_2$ mutually independently mean H or $CH_3$, $R_3$ means

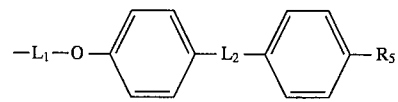

$R_4$ means

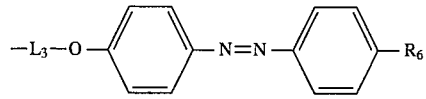

$L_1$ and $L_3$ mutually independently mean an alkylene group with 2 to 14 C atoms optionally interrupted with 1 to 3 oxygen atoms, $L_2$ means a direct bond, —CO—NH—, —NH—CO—, —CO—O— or —O—CO—, $R_5$ and $R_6$ mutually independent mean a H, CN, $C_1$-$C_5$ alkyl, $C_1$-$C_6$ alkoxy, di-$C_1$-$C_4$-alkylamino, halogen or nitro and x and y mean a number from 0.1 to 0.9, wherein x+y=1 and the monomer units are randomly distributed in the side group polymer.

* * * * *